United States Patent [19]
Allen et al.

[11] Patent Number: 5,918,239
[45] Date of Patent: Jun. 29, 1999

[54] DEFERRED DISPLAY OF WEB PAGES CORRESPONDING TO LINKS SELECTED BY USER

[75] Inventors: Michael John Allen, Endicott; William Francis Phillips, Owego, both of N.Y.

[73] Assignee: International Business Machines Corporation, Armonk, N.Y.

[21] Appl. No.: 08/785,913

[22] Filed: Jan. 21, 1997

[51] Int. Cl.[6] .................................................. G06F 17/30
[52] U.S. Cl. .......................................... 707/526; 707/501
[58] Field of Search ..................................... 707/526, 501

[56] References Cited

U.S. PATENT DOCUMENTS

| | | | |
|---|---|---|---|
| 5,625,781 | 4/1997 | Cline et al. | 345/335 |
| 5,715,445 | 2/1998 | Wolfe | 707/501 X |
| 5,727,129 | 3/1998 | Barrett et al. | 706/10 |
| 5,778,372 | 7/1998 | Cordell et al. | 707/513 X |
| 5,784,058 | 7/1998 | Lastrange et al. | 345/340 |
| 5,802,292 | 9/1998 | Mogul | 395/200.33 |
| 5,805,815 | 9/1998 | Hill | 707/501 X |
| 5,860,074 | 1/1999 | Rowe et al. | 707/526 |

OTHER PUBLICATIONS

"WEBEX: Installation and Quick Start Guide", a user's manual describing WEBEX v. 2.0, published by Traveling Software, Inc., pp. 2–35, Jan. 1997.

Brown, Marc H. and Schillner, Robert A., "Deckscape: an Experimental Web Browser", Computer Networks and ISDN Systems, vol. 27, Nno. 6, Apr. 1995.

ForeFront, Nov. 6, 1996, screen dump from www.ffg.org, 2 pages.

PC Magazine Web Page, Nov. 6, 1996, screen dump from www.pcmag.com, 2 pages.

TravelSoft, Inc., Nov. 6, 1996, screen dump from www.travsoft.com, 4 pages.

e–Surf—Fort Wayne's First Electronic News Source, Nov. 6, 1996, screen dump from www.ft-wayne.com, 2 pages.

*Primary Examiner*—Mark R. Powell
*Assistant Examiner*—Jeffrey Allen Rossi
*Attorney, Agent, or Firm*—Arthur J. Samodovitz

[57] ABSTRACT

A a client web browser receives a first user selection of a link displayed on a web page. The first user selection indicates a preference by the user for deferred display of another web page corresponding to the link. In response to the first user selection, the web browser loads the other web page from a server or other remote repository into a memory device local to the client web browser. Next, the user makes a second selection of the link (after the first user selection). The second user selection indicates a preference by the user for immediate display of this other web page. In response, the web browser fetches and displays this other web page from the local memory. However, if the user selected another link in the originally displayed web page, after the first user selection but before the second user selection and while the other web page is being loaded into the memory device, the web browser would have halted loading of this other web page and instead load and display a third web page corresponding to the other link.

11 Claims, 4 Drawing Sheets

DEFERRED DISPLAY OF WEB PAGES CORRESPONDING TO LINKS SELECTED BY USER

BACKGROUND OF THE INVENTION

The invention relates generally to client computers on the World Wide Web (WWW) and deals more particularly with web browser programs.

The WWW is well known and comprises a multitude of computer servers, respective data bases and a network by which client computers can communicate with the servers and request and load the data. A server may directly manage its own data base and access other, remote data bases on behalf of a client user. The client typically includes a "web browser" program to provide a user interface to the WWW.

The server presents the data to the user as "web pages" and each web page is represented by a "URL" address. The URL comprises an access method/protocol such as http as a prefix, a server name or "home page" and the data type, if any, as a suffix. The server name typically includes a "domain name" which is the name of a company, educational institution or other organization that owns the server. There are different ways that a client can access a web page. If the client knows the server name and data type suffix, if any, the client can directly request the web page from the server. However, if the client only knows the server name, the client can address the server name, and in response, the server will present the "home page" for the server. For those web pages for which the user does not know at least the server name, there are different types of search engines, such as key word search engines and catalog search engines, to identify a server and/or web page of interest. The home page, as well as other web pages, typically include text or graphics which serve as links to other web pages. The links are sometimes called "hot links" or "click points", and when a user selects a link with a mouse, the web browser requests the corresponding web page from the server and then displays the web page upon receipt.

Whenever a web browser requests a web page from the server, either by a user specifying a URL or selecting a link, the web page is loaded to the client machine in the form of an html file. The html file comprises a specification of each component of the web page—text, graphics, the nature of the component and whether each text or graphic is a link to another web page. The format of the conventional html is an industry standard and is further defined in "HTML for Fun and Profit" by Mary E. S. Morris published in 1995 by SunSoft Press, A Prentice Hall title. In the case of text, the html defines the actual text and its location on the web page. However, in the case of graphics, the html does not define the graphics itself but instead specifies a pointer to other files, remote to the client, which actually define the graphics. Some of the graphics are complex. While the graphics add meaning to the web page and can serve as links, they are often time consuming to load especially if the graphics are complex. The time delay is caused by the slowness of the communication lines between the client and the server or other remote repository for the graphics files. Thus, after selecting a link, the user must wait for the corresponding html and graphics files to be loaded, and this wait can be extensive. During this wait, as the web pages is gradually received, the web browser builds the web page on the screen and the user cannot utilized this or any other web page.

A general object of the present invention is to provide a method and system for reducing the time that a user is foreclosed from using a web page while another web page corresponding to one of its selected links is loaded.

SUMMARY OF THE INVENTION

The invention resides in a client web browser which receives a first user selection of a link displayed on a web page. The first user selection indicates a preference by the user for deferred display of another web page corresponding to the link. In response to the first user selection, the web browser loads the other web page from a server or other remote repository into a memory device local to the client web browser. Next, the user makes a second selection of the link (after the first user selection). The second user selection indicates a preference by the user for immediate display of this other web page. In response, the web browser fetches and displays this other web page from the local memory.

In accordance with one feature of the present invention, the user can select another link in the originally displayed web page, after the first user selection but before the second user selection and while the other web page is being loaded into the memory device. In response, the web browser halts loading of this other web page and loads a third web page corresponding to the other link. After the third web page is loaded, the web browser resumes loading of said other web page.

DETAILED DESCRIPTION OF THE PREFERRED EMBODIMENTS

Figure 1:
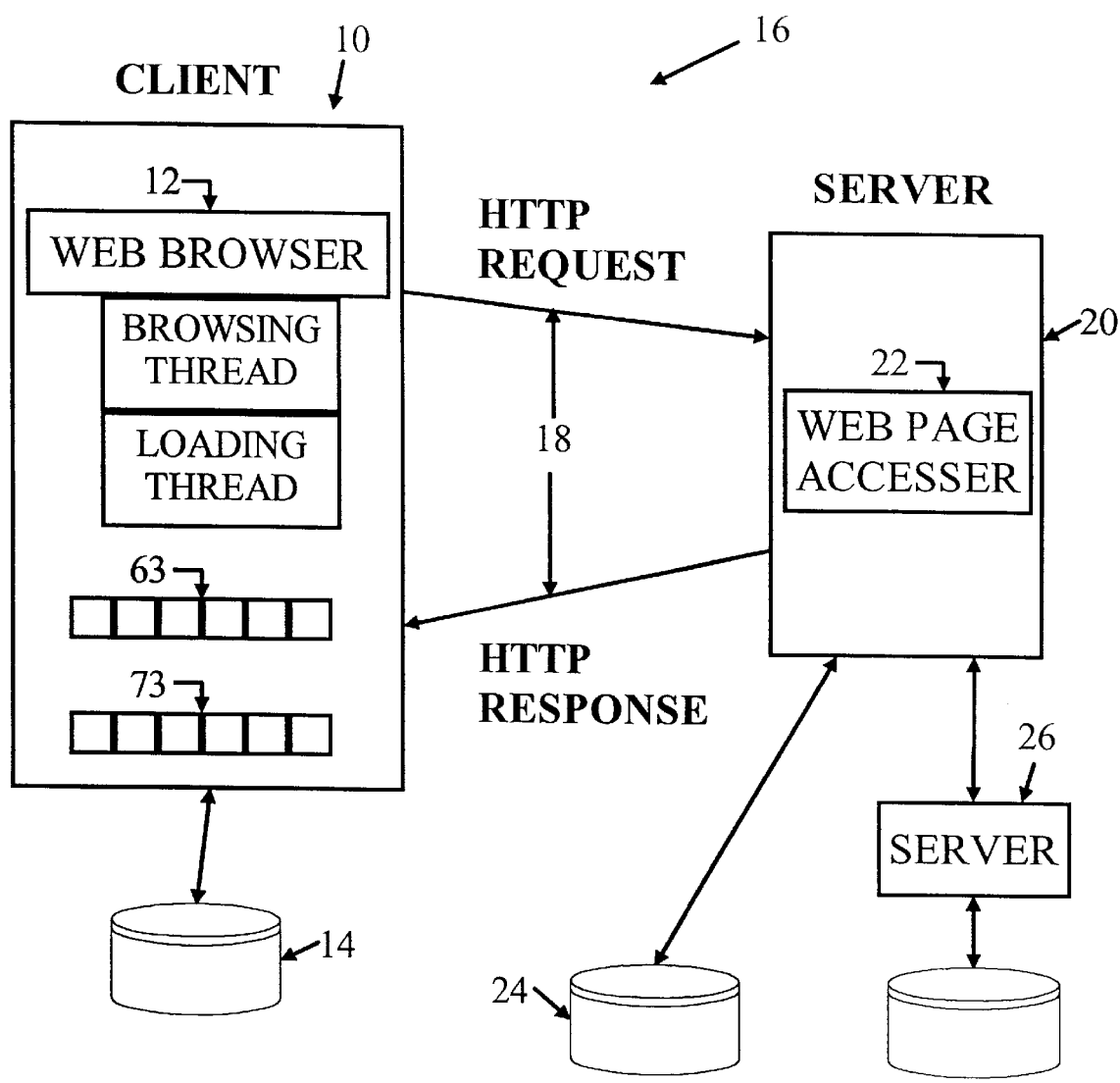
FIG. 1 is a block diagram of a client computer with a web browser according to the present invention, a server and networking which interconnects the client computer to the server.

Referring now to the drawings in detail wherein like reference numbers indicate like elements throughout, FIG. 1 illustrates a client computer generally designated 10 according to the present invention. Client computer 10 comprises a web browser program 12 and a memory 14 (RAM and/or DISK) to store web pages. Web browser 12 provides a user interface, communicates with the server (including other devices remote from the client) to obtain web pages requested by a user and controls the display of web pages to the user. Client 10 is coupled to WWW 16 via a modem and communication lines 18 such as telephone or fiberoptics. The WWW includes a multitude of servers, such as server 20. Server 20 includes a web page accessor program 22 to access web pages from disk 24 on behalf of client 10 or request web pages from another server 26 on behalf of client 10. In the illustrated example, client 10 communicates with server 20 using http access method. When server 20 supplies a web page to the client, the web page is defined by an html file which is embedded in the http communication.

Figure 2:
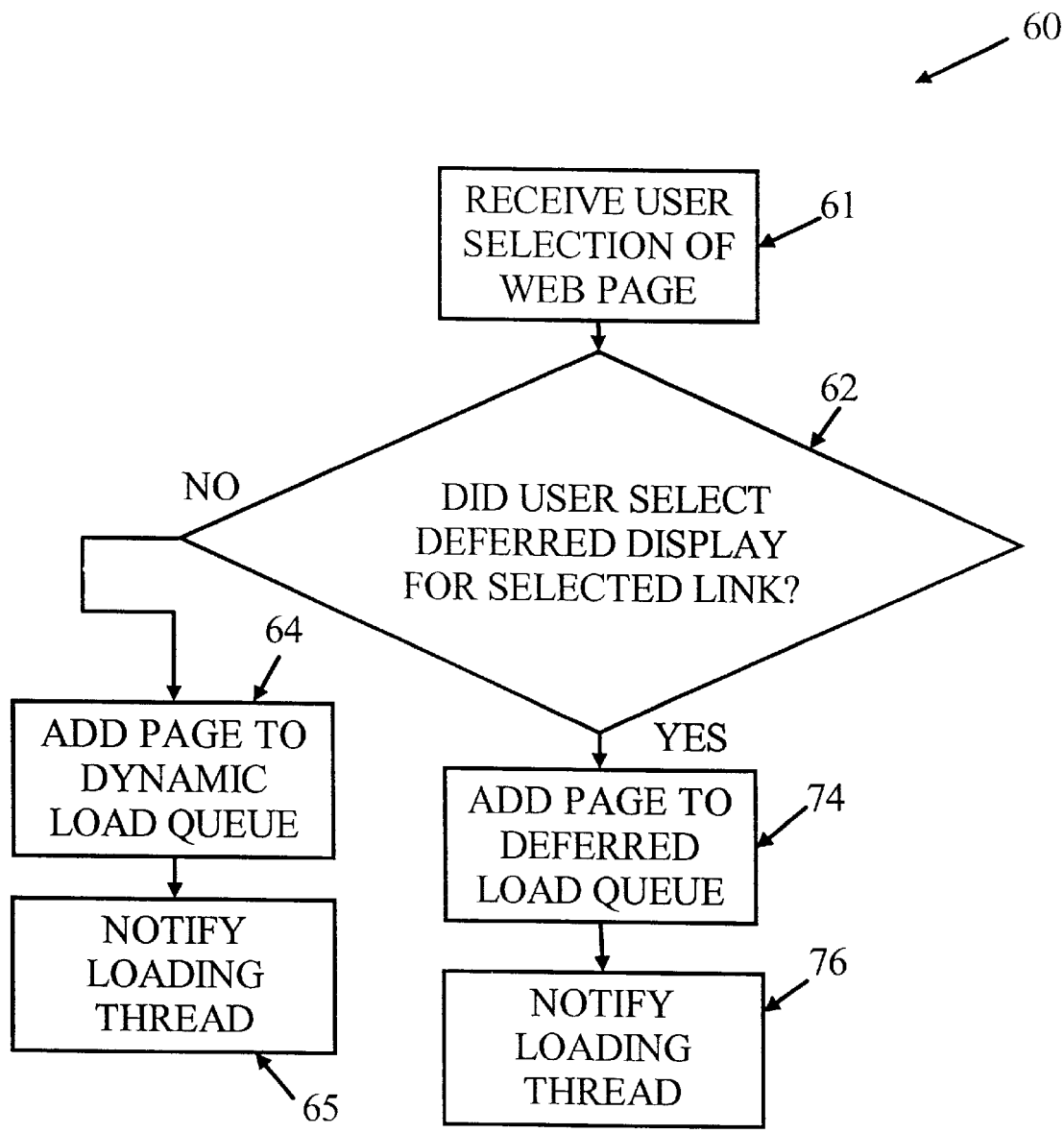
FIG. 2 is a flow chart illustrating processing by a browsing thread within the web browser of FIG. 1.

FIG. 2 illustrates processing by a browsing thread 60 within the web browser program 12. In step 61, the browsing thread receives a user selection of a web page, either by URL or link. For purposes of explanation, assume that the first selection in step 61 is by URL. Consequently, decision 62 leads to step 64 in which the browsing thread adds the URL to a dynamic load queue 63 (illustrated in FIG. 1) and then sends a message to a loading thread 66 indicating that the dynamic load queue should now be processed (step 65). The loading thread is also part of the web browser.

Figure 3A:
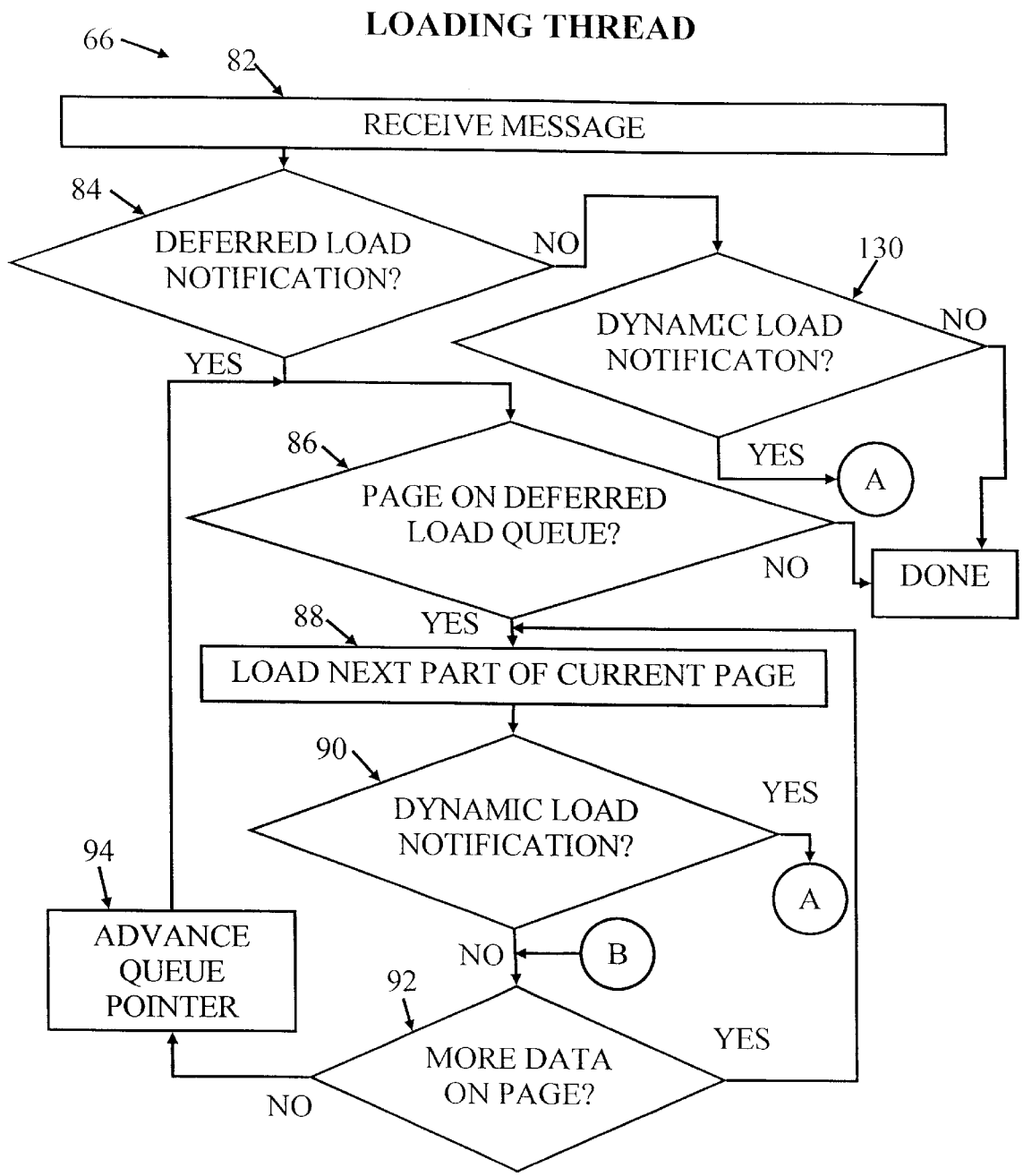
FIGS. 3(a,b) form a flow chart illustrating processing by a loading thread within the web browser of FIG. 1.
Figure 3B:
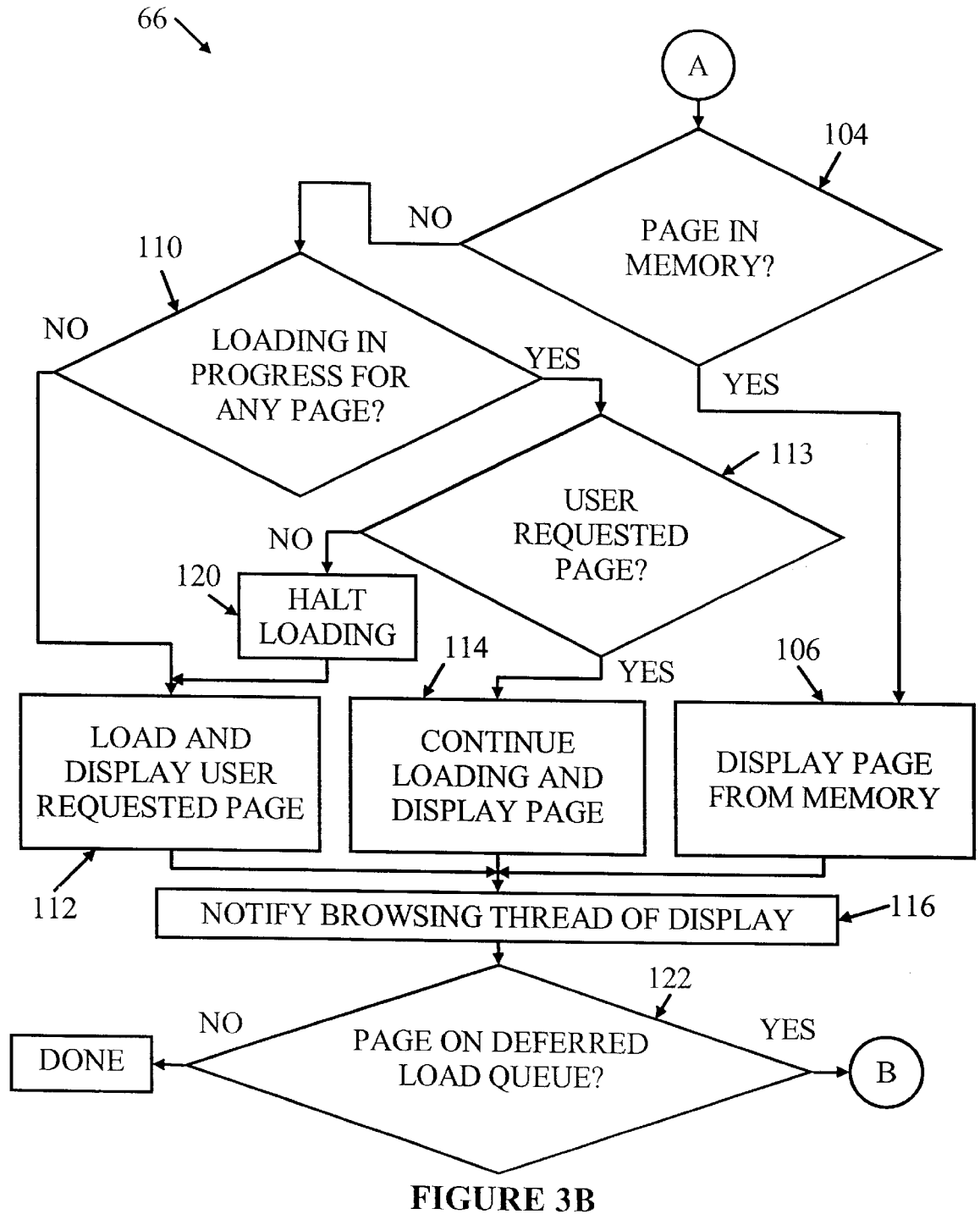

FIGS. 3(a,b) form a flow chart of the loading thread. Upon receipt of the message from the browsing thread (step 82), the loading thread first determines that this message relates to processing of the dynamic load queue and not the deferred-load queue (decisions 84 and 130). Then, the loading thread determines if the web page selected by the user currently resides in memory 14 (decision 104) as a result of a previous deferred-load operation. (The deferred-load operation is described below.) If so, the loading thread fetches and displays the web page from memory 14 (step 106). This occurs rapidly because the memory 14 is local. However, if the user-selected web page does not currently reside in memory 14, then the loading thread determines if any web page is currently in the process of being loaded pursuant to a deferred-load operation (decision 110). If not, then the loading thread requests the user-selected web page from the server, loads the user selected web page into memory 14 and then displays the user-selected web page (step 112).

Referring again to decision 110, if any page is currently in the process of being loaded pursuant to a deferred-load operation, then the loading thread determines if the user-selected web page is currently in the process of being so loaded (decision 113). If so, then the loading thread completes loading of the user selected web page and then displays the user selected web page (step 114). However, if a web page other than the user selected web page is currently being loaded, then the loading thread halts loading of this other web page (step 120), and then requests and loads the user-selected web page from the server and displays the user-selected web page (step 112). After either step 106, 112 or 114, the loading thread notifies the browsing thread 60 that the web page on the dynamic load queue has been successfully loaded and displayed (step 116). Also, the browsing thread 66 will determine if there is currently a web page on the deferred load queue waiting to be loaded or in the process of being loaded. Assume there is not at this time for purposes of explanation, so the loading thread has now completed all outstanding tasks.

Next, the user selects a link on the web page currently being displayed. If the user selects the link in the prior art manner by means of a simple "mouse" click indicating a request for an immediate load and display of the web page corresponding to this link, then processing proceeds as described above for the case where the user selected a web page by specification of a URL—step 61, decision 62, step 64, step 65 and then to the appropriate path in steps 104–116. However, if the user specially selects a link according to the present invention by a "mouse" click while depressing a certain key (such as the control key) on the key board, then decision 62 leads to step 74 instead of step 64. In step 74, the browsing thread adds the URL of the specially selected link to the front of a deferred-load queue 73 (illustrated in FIG. 1) and then notifies loading thread 66 that the deferred-load queue should now be processed (step 76).

The loading thread 66 receives the notification from the browsing thread (decision 84) and in response, determines the first URL on the (front of the) deferred-load queue (decision 86). Then, the loading thread requests the corresponding html and associated graphics from the server. As the loading thread receives and loads the html and associated graphics (step 88), the loading thread periodically checks for messages from the browsing thread indicating a user selection of a URL or link for immediate/dynamic display (decision 90). If no messages have been received, the loading thread continues with the loading, i.e. determines if there is more data of the current html and associated graphics to load (decision 92) and if so, loops back to step 88 to load the next part of the html or associated graphics.

If the loading thread has loaded the last part of the current html and associated graphics of one page on the deferred-load queue (decision 92), then the loading thread determines if there is another URL on the deferred-load queue (step 94 and decision 86). If so, the loading thread proceeds to step 88 as described above to begin loading this second web page on the deferred-load queue.

Referring back to decision 90, if the loading thread receives a message from the browsing thread indicating that the user has selected a link for immediate/dynamic display (decision 90), the loading thread determines if the web page selected for immediate display currently resides in memory 14 due to a previous deferred-load operation (decision 104). If so, the loading thread fetches and displays the web page from memory 14 (step 106). However, if the web page selected for immediate display does not currently reside in memory 14, then the loading thread determines if any web page is currently in the process of being loaded pursuant to a deferred-load operation (decision 110). If not, then the loading thread requests the web page selected for immediate display from the server, loads this web page into memory 12 and then displays this web page (step 112). Referring again to decision 110, if any page is currently in the process of being loaded pursuant to a deferred-load operation, then the loading thread determines if the web page selected for immediate display is currently in the process of being loaded (decision 113). If so, then the loading thread completes loading of the web page and then displays this web page (step 114). However, if a web page other than the web page selected for immediate display is currently being loaded, then the loading thread halts deferred-loading of this other web page (step 120), and then requests and loads the web page selected for immediate display from the server and displays the web page selected for immediate display (step 112).

After steps 106, 112 or 114, the loading thread notifies the browsing thread that the web page selected for immediate display has been displayed and then determines if there is a page on the deferred-load queue yet to be completely loaded (decision 122). If so, the loading thread continues processing with decision 92, but if not, the loading thread terminates.

Based on the foregoing, a web browser according to the present invention has been disclosed. However, numerous modifications and substitutions can be made without deviating from the scope of the present invention. Therefore, the present invention has been disclosed by way of illustration and not limitation and reference should be made to the following claims to determine the scope of the present invention.

What is claimed is:

1. A client web browser comprising:

means for receiving a first selection by a user of a first link displayed on a current web page, said first selection indicating a preference by said user for deferred display of a first web page corresponding to said first link;

means, responsive to said first selection, for loading said first web page from a remote source into a memory device local to said client web browser but not displaying said first web page as said first web page is being loaded; and means, responsive to a second selection by said user of a second link on said current web page, said second selection occurring after said first selection but before said first web page is completely loaded, said second selection indicating a preference by said user for immediate display of a second web page corresponding to said second link, for halting the loading of said first web page before said first web page is completely loaded, loading said second web page from a remote source and displaying said second web page as said second web page is being loaded.

2. A web browser as set forth in claim 1 wherein the loading means halts the loading of said first web page until said second web page is completely loaded and resumes the loading of said first web page after said second page is completely loaded.

3. A web browser as set forth in claim 2 further comprising means for receiving a third selection by said user of said first link, said third selection occurring after said first web page is completely loaded and indicating a preference by said user for immediate display of said first web page, for fetching said first web page from said local memory device and displaying said first web page.

4. A method for browsing a world wide web from a client computer, said method comprising the steps of:

receiving at said client computer a first selection by a user of a first link displayed on a current web page, said first selection indicating a preference by said user for deferred display of a first web page corresponding to said first link;

in response to said first selection, loading said first web page from a remote source into a memory device local to said client computer but not displaying said first web page as said first web page is being loaded;

receiving at said client computer a second selection by said user of a second link on said current web page, said second selection occurring after said first selection but before said first web page is completely loaded, said second selection indicating a preference by said user for immediate display of a second web page corresponding to said second link; and in response to said second selection, halting the loading of said first web page before said first web page is completely loaded, loading said second web page from a remote source and displaying said second web page as said second web page is being loaded.

5. A method as set forth in claim 4 wherein the loading of said first web page is halted until said second web page is completely loaded and resumed after said second page is completely loaded.

6. A method as set forth in claim 5 further comprising the steps of:

receiving a third selection by said user of said first link, said third selection occurring after said first web page is completely loaded and indicating a preference by said user for immediate display of said first web page; and in response to said third selection, fetching said first web page from said local memory device and displaying said first web page.

7. A method as set forth in claim 4 further comprising the steps of:

receiving a third selection by said user of said first link, said third selection occurring after said second web page is completely loaded and displayed and indicating a preference by said user for immediate display of said first web page; and in response to said third user selection, fetching said first web page from said local memory device and displaying said first web page.

8. A computer program product for browsing a world wide web from a client computer, said computer program product comprising:

a computer readable medium;

first program instruction means for instructing a processor to receive a first selection by a user at said client computer of a first link displayed on a current web page, said first selection indicating a preference by said user for deferred display of a first web page corresponding to said first link;

second program instruction means for instructing a processor to respond to said first selection by loading said first web page from a remote source into a memory device local to said client computer but not displaying said first web page as said first web page is being loaded;

third program instruction means for instructing a processor to receive a second selection by said user of a second link on said current web page, said second selection occurring after said first selection but before said first web page is completely loaded, said second selection indicating a preference by said user for immediate display of a second web page corresponding to said second link; and fourth program instruction means for instructing a processor to respond to said second selection by halting the loading of said first web page before said first web page is completely loaded, loading said second web page from a remote source and displaying said second web page as said second web page is being loaded; and wherein all of said program instruction means are recorded on said medium.

9. A computer program product as set forth in claim 8 wherein said fourth program instruction means instructs a processor to halt the loading of said first web page until said second web page is completely loaded and resume the loading of said first web page after said second page is completely loaded.

10. A computer program product as set forth in claim 9 further comprising:

fifth program instruction means for instructing a processor to receive a third selection by said user of said first link, said third selection occurring after said first web page is completely loaded and indicating a preference by said user for immediate display of said first web page; and sixth program instruction means for instructing a processor to respond to said third selection by fetching said first web page from said local memory device and displaying said first web page; and wherein said fifth and sixth program instruction means are recorded on said medium.

11. A computer program product as set forth in claim 9 further comprising:

fifth program instruction means for instructing a processor to receive a third selection by a user of said first link, said third selection occurring after said first web page is completely loaded and indicating a preference by said user for immediate display of said first web page; and sixth program instruction means for instructing a processor to respond to said third selection by fetching said first web page from said local memory device and displaying said first web page; and wherein said fifth and sixth program instruction means are recorded on said medium.

\* \* \* \* \*